Feb. 10, 1931.   W. A. MOFFETT   1,791,738
HAMMOCK SUPPORT FOR AIRSHIPS AND OTHER CRAFT
Filed Sept. 9, 1929   3 Sheets-Sheet 1

Inventor
William Adger Moffett
By Harold Dodd
Attorney

Feb. 10, 1931.   W. A. MOFFETT   1,791,738
HAMMOCK SUPPORT FOR AIRSHIPS AND OTHER CRAFT
Filed Sept. 9, 1929   3 Sheets-Sheet 3
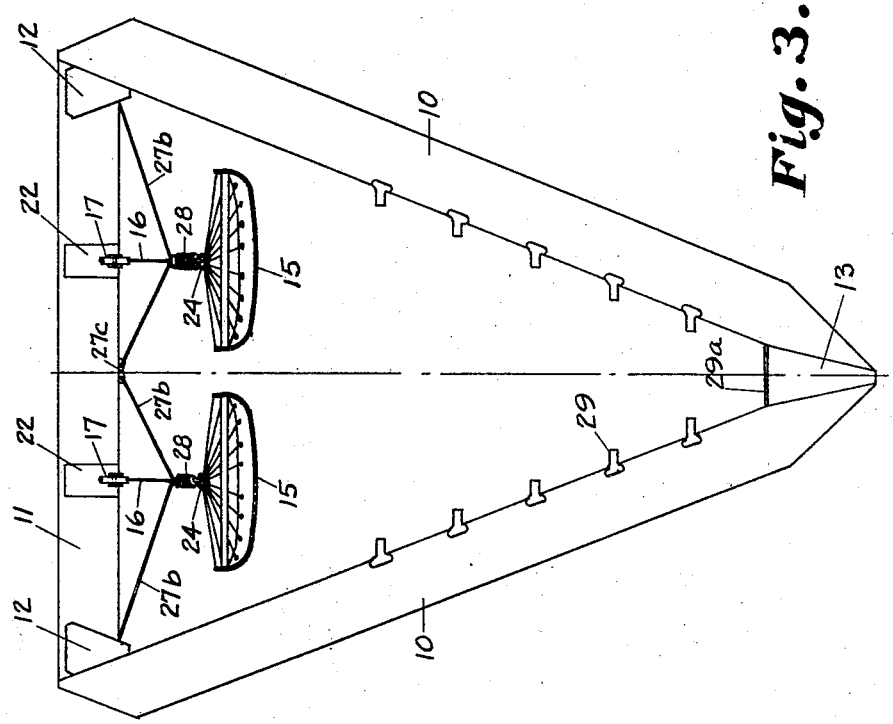
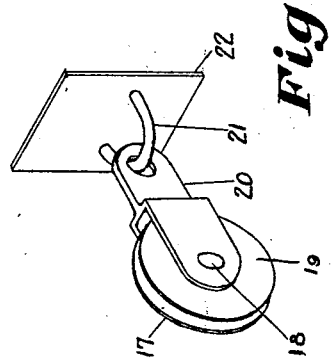
Inventor
William Adger Moffett
By
Attorney ent Feb. 10, 1931

1,791,738

UNITED STATES PATENT OFFICE

WILLIAM ADGER MOFFETT, OF CHARLESTON, SOUTH CAROLINA

HAMMOCK SUPPORT FOR AIRSHIPS AND OTHER CRAFT

Application filed September 9, 1929. Serial No. 391,464.

(GRANTED UNDER THE ACT OF MARCH 3, 1883, AS AMENDED APRIL 30, 1928; 370 O. G. 757)

The objects of my invention are to simplify in structure, cost and upkeep the former devices for this purpose and to increase their comfort, convenience and durability.

These and other objects of my invention will be apparent from the following detailed description and the accompanying drawings illustrating my invention.

In the drawings Figure 1 is a central longitudinal section through the keel structure of an airship, to which my invention is applied in the form of a hammock and its support which is in a broad sense typical of the other adaptations of my invention.

Figure 3 is a vertical transverse section taken on a line 3—3 of Figure 1.

Figure 4 is a detail view illustrating a pivotal mounting for the pulleys when employed as part of the supporting means.

Figure 1:
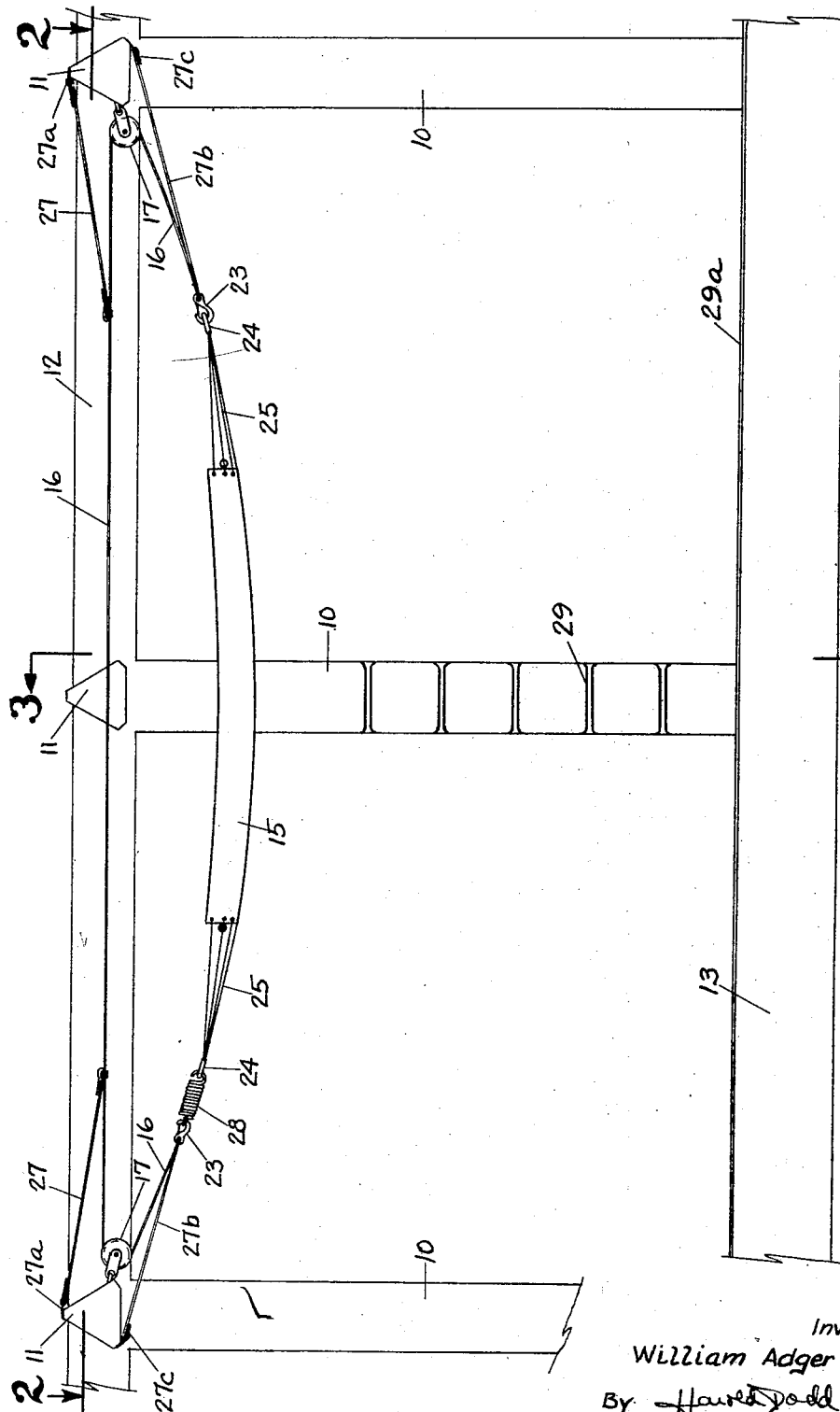

In the drawings, in which like characters of reference denote the same parts, my invention is specifically shown as applied to an airship, because that type of craft is the one liable to afford the greatest effects of pitching and rolling, although it is also applicable to other vessels and other conditions in which substantial movement or vibration is a feature.

In the drawings, I have omitted all of the structural details of the airship proper and have included only a portion of the frame structure of a specific type of airship to which my invention is applied, this portion of the frame structure being in this instance the keel frame structure, comprising a plurality of, for instance, upright members 10, connected by transverse members 11 at their tops and longitudinal members 12, extending between their tops, and a further longitudinal member 13, connecting the bottoms of members 10.

While in its broad aspect it is immaterial as to what part or parts of the vessel or object support the platform, berth, bunk or hammock, yet in the specific instance shown, the same is or are supported from the transverse members 11.

The numeral 15 represents either a conventional plane or platform, or berth, bunk or hammock, each of which is supported from a point above so that the same may swing in any direction due to the pitching, rolling or other movement of the airship, vessel or other support.

Figure 2:
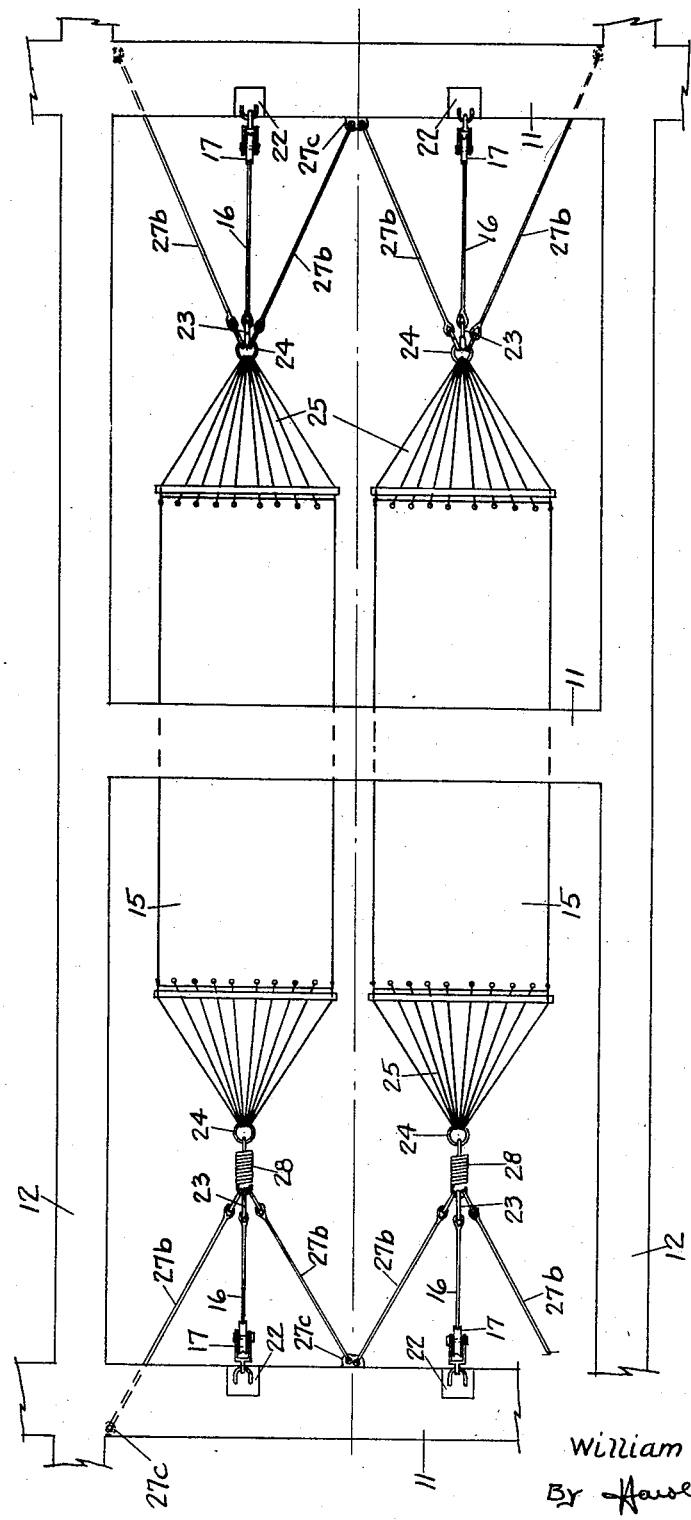
Figure 2 is a plan view taken on a line 2—2 of Figure 1.

The specific construction of such support shown in Figures 1, 2 and 3 is by cable 16 running on oppositely located grooved pulleys 17, each preferably mounted upon ball bearing pivot 18, in sheave 19, which is preferably pivotally mounted to members 11 or other support. Any form of such pivot or mounting may be employed, although I have shown said sheave 19 provided with a ring or eye 20, preferably in a plane parallel to the axis of bearing 18, with a staple 21 extending through said ring or eye 20 and secured to a base plate 22, which is riveted or otherwise secured to member 11.

The cable 16 preferably extends between the tops of grooved pulleys 17, while each of the opposite ends of cable 16 extend downwardly and inwardly from each of their respective pulleys 17, where said opposite ends of cable 16 are secured to their correspondingly opposite ends of a plane or platform, bunk, berth or hammock, the specific manner of said securement being shown to include a snap hook 23 and cooperating ring 24, one of which is secured to each of the ends of cable 16 while the other is secured to the respective opposite ends of element 15, preferably by a plurality of diverging cables or shroud lines 25, extending from the opposite ends of element 15.

Element 15 is by this means pendulously suspended below its point of support and due to its inherent weight and that of any object or person or persons who may be thereon, said element 15 may move in any direction relative to its upper support. For instance, when the movement of element 15 is endwise, that is, to the right or left in Figure 1, the cable 16 substantially correspondingly runs over its respective grooved pulley 17. When the movement of element 15 is at an angle to said endwise movement, the rings or eyes 20 of the supporting pulleys 17 move relative to their respective anchoring staples 21. When the movement of element 15 is a component of end and side movements, there is a combined movement of cable 16 over pulleys 17 and of rings or eyes 20 upon their respective staples 21.

In the instance just described and shown in Figure 1, where the element 16 extends lengthwise of the airship or vessel, endwise movement of each of elements 15 is occasioned by the pitch of the aircraft or other vessel to maintain substantially the longitudinal plane of each element regardless of the shifting of the longitudinal plane of the air ship or other vessel due to its said pitch, while likewise each element 15 moves sidewise relative to its upper support due to the rolling of the airship or other vessel.

The endwise movement of each of the elements 15 occasions, in the instance shown, more or less substantial movement of supporting cable 16 of each element 15 over each of their supporting pulleys 17 and it is desirable and advantageous to decelerate this movement, which deceleration is accomplished in the instance shown in Figure 1 by a plurality of suitable springs or rubber cords 27, each of whose opposite ends is secured to member 11 at 27a and to cable 16 at a point where such cable is not likely to come in contact with either of the pulleys 17. With said springs or rubber cords 27 being independent of the supporting cable 16 and extending substantially in the direction of said cable, free movement of the element 15 is insured, subject only to the progressive deceleration of said springs 27. The springs 27, extending in opposite directions from their said securements at opposite ends respectively to cable 16 and at 27a of member 11, thus exert stress in opposite directions upon that portion of cable 16 extending intermediate pulleys 17, movement of cable 16 in either direction will occasion the stretching of one of said elements 27 and the contraction of the other element 27 which decelerates the endwise movement of the element 15.

In the instance shown in the drawings, Figure 1, the springs 27 are secured at such points to the cable 16 and the framework that they decelerate only the pitching or endwise movement of the elements 15. In said instance, in order to decelerate the rolling or lateral movement of elements 15, I provide further springs 27b, of which I preferably use a plurality at each end of each element 15, secured at one of their ends preferably by a snaphook to either element 23 or 24 and their opposite ends are preferably likewise secured to a hole or ring 27c in the framework. In said instance, each spring 27b extends at an angle to cable 16.

To absorb and lessen the shock of more or less sudden startings and stoppings of the endwise movement of each of elements 15, I provide a spring 28 which may either be of rubber or of coiled metal and which forms a part of cable 16 preferably at a point where the same is not liable to run over the groove of either of pulleys 17. In the instance shown in Figure 1, said spring 28 is secured between cables or shrouding 25 and either of the elements 23 and 24.

My invention also contemplates convenient access from a portion or portions of the airship or other vessel to each of the elements 15 so that one or more of the personnel of such craft may place themselves thereon for rest, comfort or otherwise, as well as to retire therefrom directly to such craft at their convenience, or that sensitive objects or apparatus may be readily placed thereon or removed therefrom, in order that this same may, when desired, be freed from the effects of the pitching and rolling of the airship or other craft. In the instance shown in Figures 1 and 2 of the drawings, this means of convenient communication between a portion of the vessel and each element 15 is in the form of ladder rungs 29, and walkway 29a.

The invention herein described may be manufactured and used by or for the Government of the United States for governmental purposes without the payment to me of any royalty thereon or therefor.

Having now so fully described my invention that others skilled in the art may make and use the same therefrom, what I claim and desire to secure by Letters Patent is:

1. In a support for hammocks or the like, the combination of a hammock or the like, a cable secured at its opposite ends to opposite ends of the hammock or the like, a grooved pulley revolubly mounted on a support above the hammock or the like above each of the opposite ends and substantially on the longitudinal center of the hammock or the like, said cable being adapted to pass over said pulleys and constitute the sole support of the hammock or the like, and a pair of springs secured at their outer ends to said support with their inner portions extending independently of and substantially in the direction of the cable intermediate said pulleys and their inner ends secured to said cable, whereby said hammock or the like may swing laterally with the cable in the pulley-grooves substantially as a fulcrum and longitudinally by the cable running over the pulleys and be decelerated as to its longitudinal movement by said springs.

2. In a support for hammocks or the like, the combination of a hammock or the like, a cable secured at its opposite ends to opposite ends of the hammock or the like, a grooved pulley revolubly mounted on a support above the hammock or the like above each of the opposite ends and substantially on the longitudinal center of the hammock or the like, said cable being adapted to pass over said pulleys and constitute the sole support of the hammock or the like, a pair of springs at each end of the hammock or the like with the springs of each pair extending substantially horizontally in opposite directions and having their opposite ends secured respectively to said support and said hammock or the like, whereby said hammock or the like may swing laterally with the cable in the pulley-grooves substantially as a fulcrum and longitudinally by the cable running over the pulleys and be decelerated as to its lateral movement by said springs.

3. In a support for hammocks or the like, the combination of a hammock or the like, a cable secured at its opposite ends to opposite ends of the hammock or the like, a grooved pulley revolubly mounted on a support above the hammock or the like above each of the opposite ends and substantially on the longitudinal center of the hammock or the like, said cable being adapted to pass over said pulleys and constitute the sole support of the hammock or the like, a pair of springs secured at their outer ends to said support with their inner portions extending independently of and substantially in the direction of the cable intermediate said pulleys and their inner ends secured to said cable, and a pair of separate springs at each end of the hammock or the like with the springs of each pair extending substantially horizontally in opposite directions and having their opposite ends secured respectively to said support and said hammock or the like.

4. In a support for hammocks or the like, the combination of a hammock or the like, a cable secured at its opposite ends to opposite ends of the hammock or the like, a grooved pulley revolubly mounted on a support above the hammock or the like above each of the opposite ends and substantially on the longitudinal center of the hammock or the like, said cable being adapted to pass over said pulleys and constitute the sole support of the hammock or the like, a pair of springs secured at their outer ends of said support with their inner portions extending independently of and substantially in the direction of the cable intermediate said pulleys and their inner ends secured to said cable, a pair of separate springs at each end of the hammock or the like with the springs of each pair extending substantially horizontally in opposite directions and having their opposite ends secured respectively to said support and said hammock or the like, and a shock-absorber spring having its opposite ends connected respectively to one end of said cable and to the adjacent end of the hammock or the like.

WILLIAM ADGER MOFFETT.